July 17, 1923.

T. L. LA MALTA

CUT-OFF SAW

Filed April 12, 1922

INVENTOR
Thomas L. La Malta
BY
J.H. Weatherford
ATTORNEY

July 17, 1923.

T. L. LA MALTA

CUT-OFF SAW

Filed April 12, 1922     4 Sheets-Sheet 3

1,461,919

INVENTOR
Thomas L. La Malta
BY
J. H. Weatherford
ATTORNEY

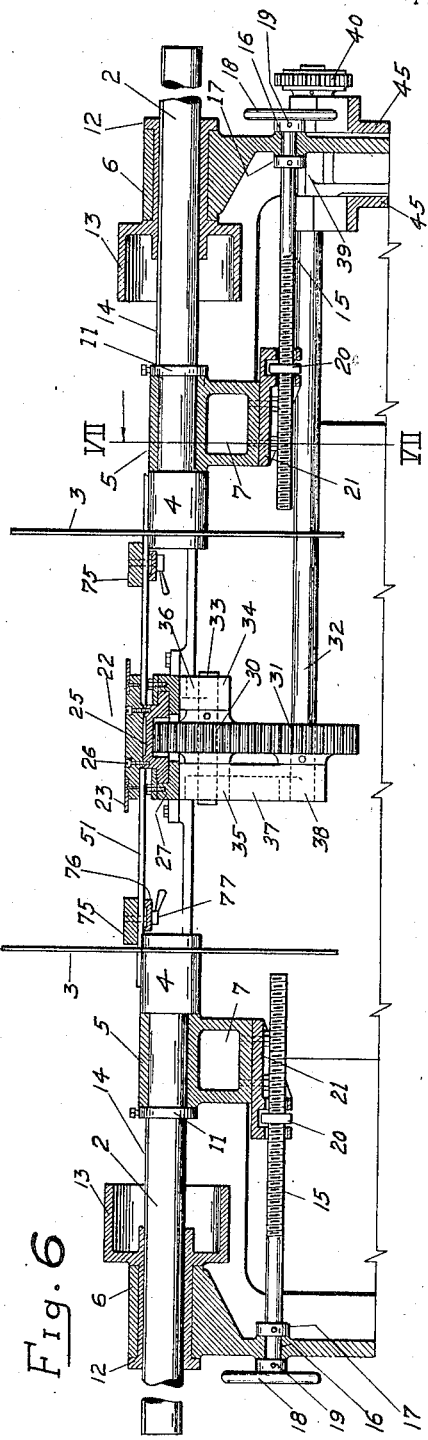

Patented July 17, 1923.

1,461,919

UNITED STATES PATENT OFFICE.

THOMAS L. LA MALTA, OF MEMPHIS, TENNESSEE.

CUT-OFF SAW.

Application filed April 12, 1922. Serial No. 551,790.

*To all whom it may concern:*

Be it known that I, THOMAS L. LA MALTA, of the United States, residing in the city of Memphis, county of Shelby, in the State of Tennessee, have invented certain new and useful Improvements in Cut-Off Saws, of which the following is a full, clear, and exact description, such as will enable anyone skilled in the art to make and use the same.

My invention relates to improvements in machines for cutting off lumber which is to be used, especially for boxes and similar articles in which it is necessary that the ends be parallel and preferably at right angles to the sides and in which it is necessary that means be provided for adjusting the distance between the saws in order that varying lengths of stock may be cut; it relates to improvements whereby stock may be suitably held and fed to the saws while the cutting is being done, and for means whereby the ends of the stock adjacent the saws may be suitably supported, and it further relates to improvements in the means by which the length of stroke may be varied and at the same time an automatic quick return may be provided for every varying length of stroke.

I accomplish these objects as will be more fully hereinafter set forth in the drawings, specifications and claims.

In the drawings

Fig. 6 is a section on the center line of the saw arbors.

Fig. 7 is a section on the line VII—VII, of Fig. 6.

Fig. 8 is a diagrammatic plan showing an exaggerated scale that the saw arbors each make an angle with the longitudinal center line.

Figures 1, 2:
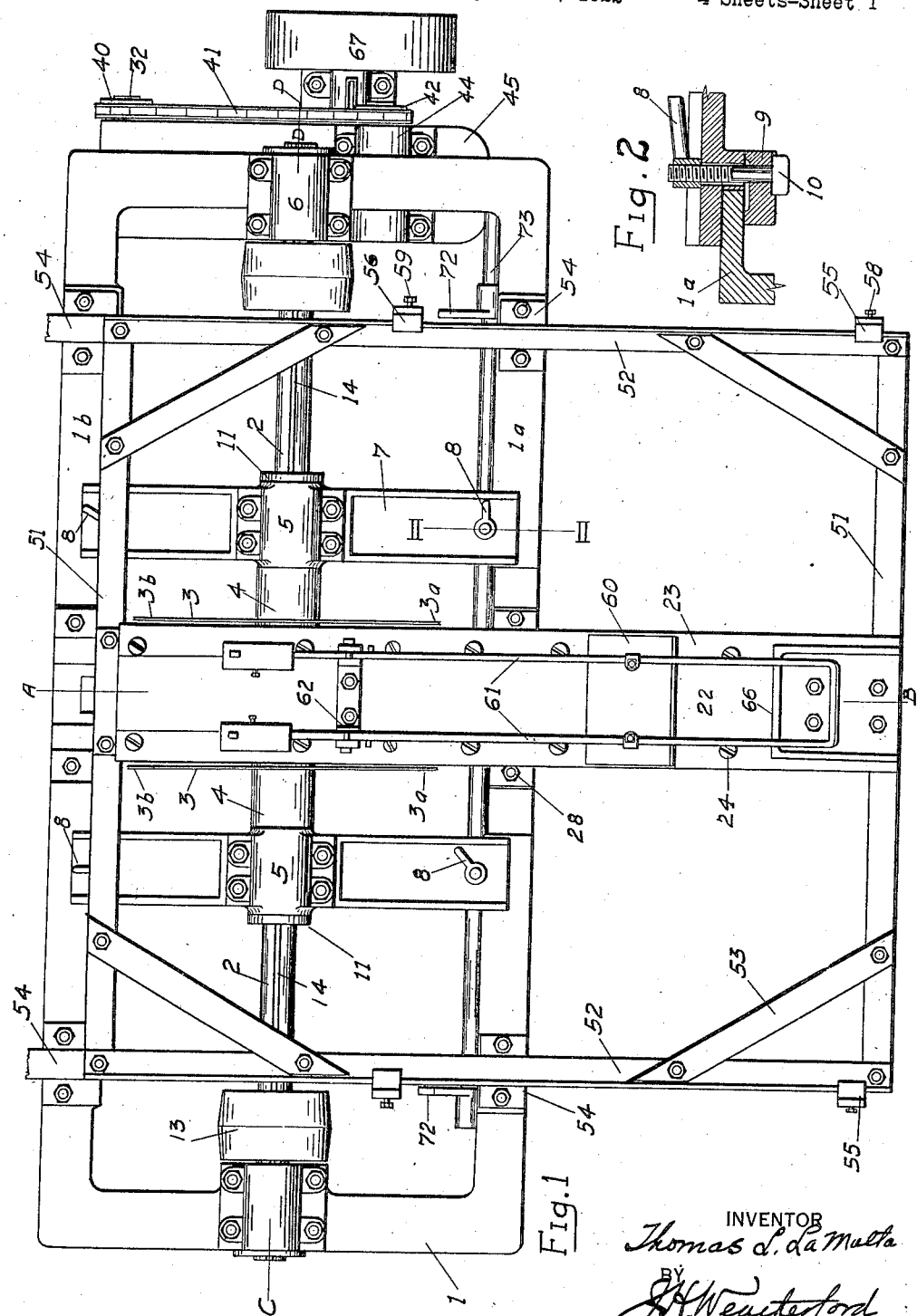
Fig. 1 is a plan view of my improved machine showing more particularly the relation of the saws to the cut-off table, the saws being set for the shortest length of material which may be cut on this particular machine.
Fig. 2 is a section on the line II—II of Fig. 1, on an enlarged scale, to show the arrangement of the clamping device used on the bracket which carries the adjustable bearing for the saw arbors.
Figure 3:
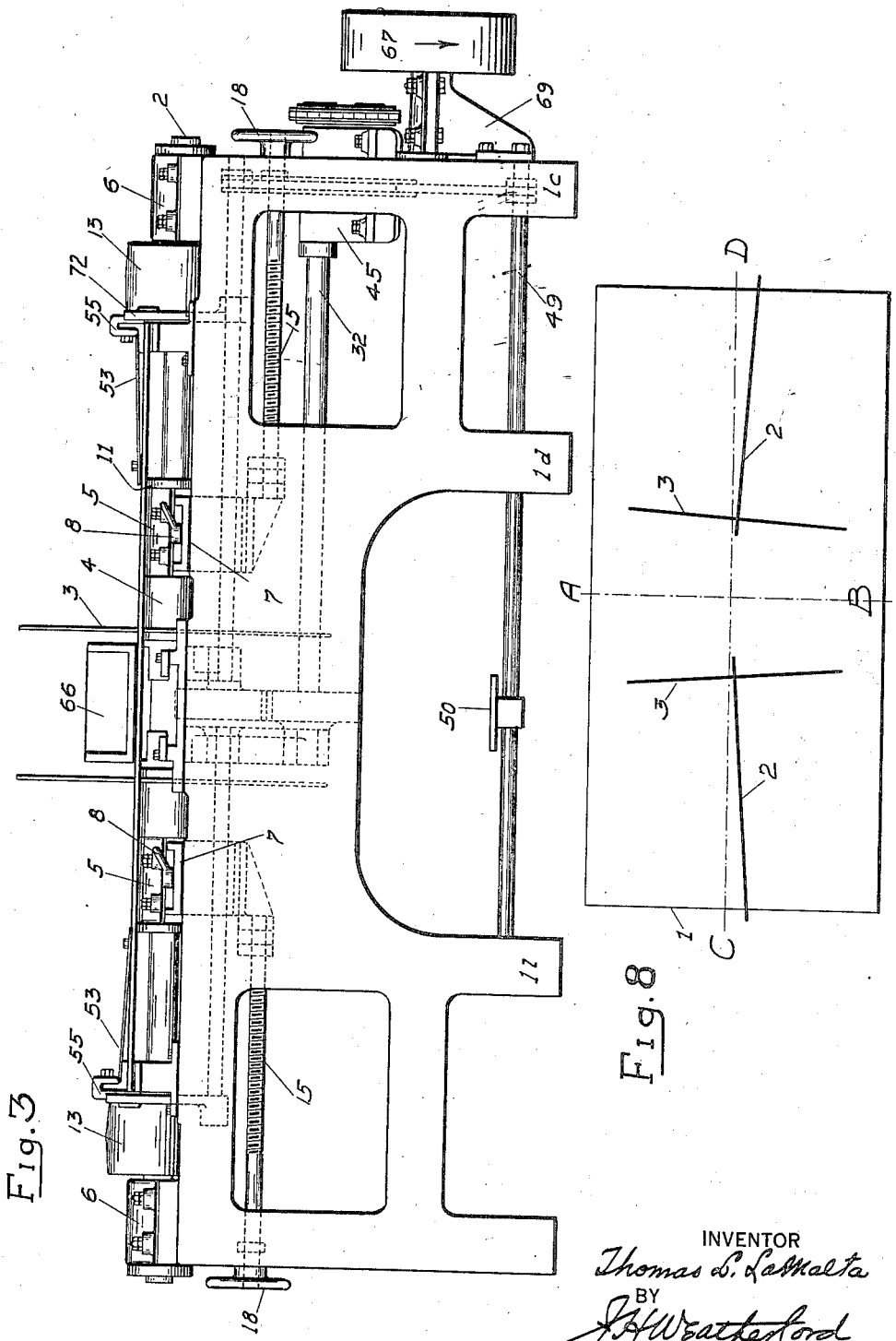
Fig. 3 is a front elevation of the machine.

Referring now to the drawings in which the various parts are designated by the same or like numerals in all the views, 1 is the main frame of the machine which is preferably made in one solid casting, but which can of course be bolted up, if it be so desired. On this frame is carried two centrally mounted saw arbors 2—2, which are symmetrically disposed on each side on the transverse center line A—B of the machine. These two saw arbors each carry a saw 3, and are set so that the alignment of each make a slight angle with the longitudinal center line C—D of the frame. This divergence is clearly shown in the diagrammatic view Fig. 8, in which the angle which the two arbors make with the center line is very much distorted for the purpose of clearness only. In the machine itself, this angle is only such as is necessary to bring the front or cutting sides 3$^a$, of the saws, approximately $\frac{1}{16}$ of an inch closer than the back 3$^b$, of the same, so that when the material to be cut off passes through the machine the back of the saws will clear it.

The arbors 2, have large collars 4, which are adapted to support the ends cut off from the stock, which collars are of sufficient length to provide clearance for the waste cut off, and lie between the saws and the bearings 5—5 therefor. The saw arbors 2 are each carried by a symmetrically located inner bearing 5 supporting the saw end of the arbor and an outer bearing 6, supporting the outer end of the arbor. The bearing 5, in each case is mounted on a cross bracket 7, which spans from the front side 1$^a$, to the back side 1$^b$ of the frame, which bearing is adjustable longitudinally thereon. Each end of the bracket 7 is provided with a clamping nut 8 and a clamp 9, which is shown in detail in Fig. 2. The clamp 9 is adapted to come against the under side of the frame 1$^a$, or 1$^b$, as the case may be, and is held by means of a bolt 10, which passes through the clamp 9 and is tightened by means of the nut 8. The saw arbor 2, is held from longitudinal motion relative to the bearing 5, and longitudinally moved therewith, by means of the collar 4, which comes against the inner end of the bearing 5, and a collar 11, which bears against the opposite or outer end thereof. The outer end of the arbor 2 is journalled in the bearing 6, through an intermediary bushing 12, which is an integral part of the belt pulley 13. This bushing 12, is provided with a key-way which slides on a key or spline 14, which is carried by the said arbor and through which the pulley drives the arbor. It will be seen therefore, that the arbors 2, are each mounted in bearings 5, which may be moved longitudinally along the frame and which when so moved, will give a corresponding longitudinal movement to the arbor—thus bringing the saws a greater or less distance apart and that at the outer ends, each slides longitudinally in its bushing 12, which is mounted in a longitudinally fixed position in the stationary bearing 6. It will likewise be seen that each of these arbors is rotated by its pulley 13, which is correspondingly longitudinally fixed, and which may therefore be driven by a belt from a driving pulley similarly longitudinally fixed. The movable bearings 5, are each capable of independent adjustment, which is had through a screw 15, which is free to turn in a bearing 16, in the end of the frame. The screw 15 is held from longitudinal movement by means of a collar 17 and the hub of the handwheel 18, and is turned by the handwheel 18, which is fastened to the screw by some such means as the pin 19 shown. The screw 15 engages a nut 20 in the bracket 21, which is fastened to the lower portion of the cross bracket 7.

The stock to be cut is carried by a feed table, which table is moved transversely across the frame of the machine by means of a feed mechanism which will be later described. The feed table is made up of a saw table 22, extending transversely of the frame 1. This table which is of metal has its edges lined with fiber strips 23, which lie parallel with the length of the table, and are let into the same so that the top of the fiber comes flush with the inner part of the table, and is fastened thereto by means of countersunk head screw 24. These fiber strips overlap the edges of the metal plates and prevents the saw from coming in contact with the metal. The plate 22, in turn, is fastened to a sliding member 25, by means of the flush headed cap screw 26. This sliding member is slidably mounted in a transverse guide 27, which extends across the main frame of the machine and is bolted to the front portion 1ª, of same, and the rear portion 1ᵇ, by bolts 28.

The sliding member 25, has rack teeth 29 formed on the bottom thereof and is moved backward and forward in the guides 27 by means of an idler pinion 30, which in turn is actuated by a driving pinion 31 keyed on a driving shaft 32, which extends longitudinally to one end of the main frame. The idler pinion 30, is carried on an idler shaft 33 which is journalled in bearings 34 and 35 carried respectively by brackets 36 and 37 bolted to the underside of the rear top portion 1ᵇ of the frames.

The driving shaft 32 is journalled in a bearing 38, carried by the bracket 37 and extends longitudinally from the bearing 38 to and through a bearing 39 on the end of the frame, and is driven by a sprocket pinion 40, fastened on its outer end. This sprocket pinion is driven through a sprocket chain 41 from a driving sprocket 42, which is mounted on and driven by a shaft 43 which shaft is journalled in bearings 44 carried by a swinging frame 45, which swinging frame is journalled at one end around the shaft 32. The opposite or free end of the swinging frame 45 is raised or lowered by means of the vertical rod 46, to which it is pivotally attached by means of a bolt 47. The vertical rod 46 is actuated by an arm 48, which is keyed to a cross shaft 49, which shaft is mounted in bearings in the legs, 1ᶜ, 1ᵈ, and 1ᵉ of the main frame. To this shaft is attached a foot lever 50, approximately centrally located, which foot lever when depressed, rocks the shaft 49 and raises the arm 48 and through the vertical rod 46, raises the swinging frame 45. When released this frame by its own weight drops to its former position.

At each end of the saw table 22, a cross bar 51 extends longitudinally approximately equal distances. These cross bars are bolted to the under side of the saw table and at each end carry transverse members 52, preferably made of angle iron, which members are braced to the cross bars 51 by braces 53. The whole frame thus made being solidly bolted or riveted together, as the case may be. These angle iron members rest on bearing brackets 54 which brackets are firmly bolted to the upper part of the frame 1. 55 are stops for the forward motion of the feed table, and 56 stops for the reverse motion of the table.

These stops clamp over the angle arm frames 52 and may be set at any desired point along these frames, by means of set screws 58 and 59 respectively, and govern the length of the forward and reverse stroke of the feed table. The stock to be cut off by the saws 3, is laid flat on the top of the feed table, and held down thereon, by a board 60, which is clamped to the under side of a U shaped clamping lever 61, carried by a double bracket 62, bolted to the top of the saw table 22. This U shaped lever 61, may be pivoted in the bracket 62, but is preferably held by means of four pins 63, 64 of which the two pins 63 pass through each leg of the U and are fastened therein, one in front and one behind the bracket 62. The other two pins 64, pass through the two legs of one side of the bracket 62, immediately above and below the arms of the said U shaped clamping lever 61, which is shown in a raised position. 66 is a stop bolted to the saw table 22 against which, one edge of the stock to be cut off, is placed. When the stock is placed on the table 22, the clamping lever 61 is held down by the operator, thus holding the stock while it is carried forward against these saws by the forward movement of the feed table.

The actuating means for the feed table consists of a belt pulley 67, which may be driven by a belt from a suitable source of power which belt pulley is mounted on a shaft 68 journalled in a fixed bearing 69 rigidly bolted to the end of the main frame 1. The opposite end of this shaft 68, carries a friction pinion 70, which is driven by the belt pulley 67. 71 is a double faced friction pulley which is mounted on the shaft 43 and rigidly keyed thereto. This pulley is driven in one direction to cause the forward motion of the feed table by raising the same until the inside of the rim comes in contact with the bottom of the friction pinion 70 and is reversed for the return motion by bringing the hub of the wheel down on the upper part of the same friction pinion, thus providing a slow forward motion and a quick return motion. The friction pinion is preferably a paper friction, but may be of fiber, leather or other suitable material to give proper friction contact with the friction pulley which preferably has metal faces only.

The action of the machine is as follows:
Stock to be cut off, is placed on the saw table, with one side firmly against the stop 66. The clamping lever 61, is pulled and held down until the plate 60 clamps the stock, and the operator then steps on the foot lever 50 raising the swinging frame 45 upward and bringing the friction pulley 71 into engagement with the bottom of the friction pinion 70. The pulley 67 being constantly driven in the direction of the arrow, rotates the friction pinion 70 in the same direction and with it the pulley 71. This pulley through the shaft 43 drives the sprocket wheel 42, the sprocket chain 41, the sprocket pinion 40 and through the shaft 32, drives the pinion 31 and through it the idler pinion 30, which pinion is in mesh with the rack 29— thus causing the saw table 22 to be carried forward and bring the stock against the saw.

Figure 4:
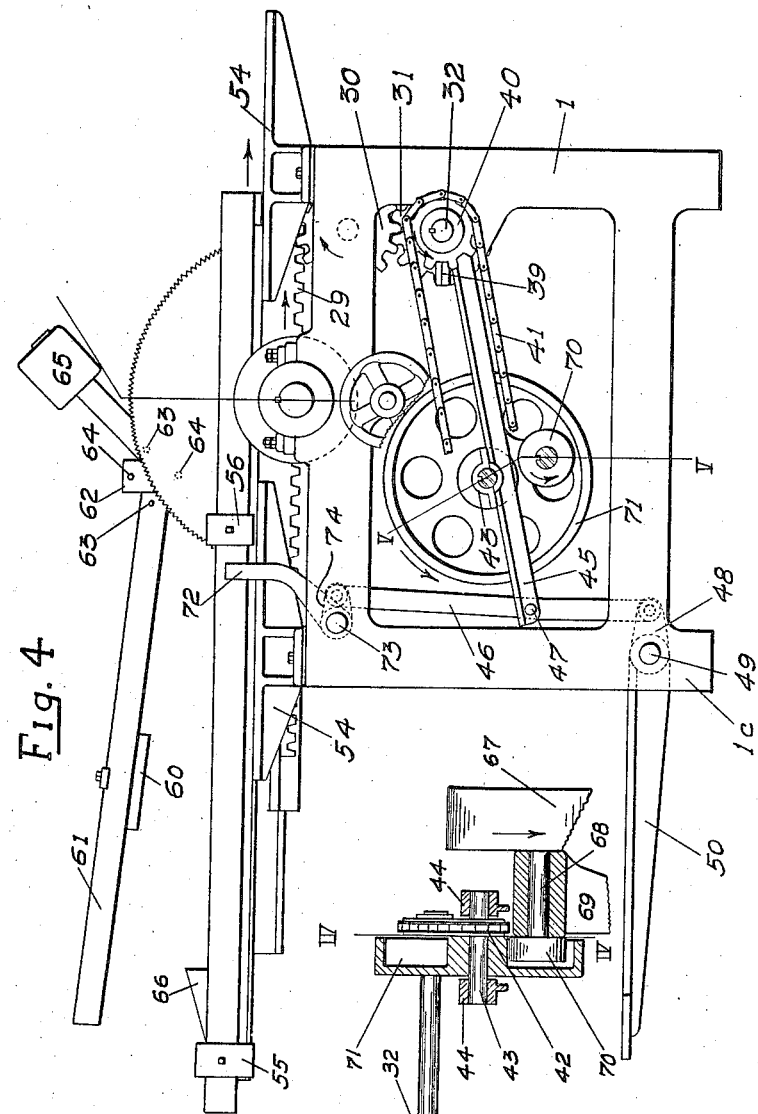
Fig. 4 is an end elevation with the driving pulley for the feed mechanism and the bearing for the main friction wheel cut away on the line IV—IV of Fig. 5, and a portion of the driving chain, also cut away.
Figure 5:
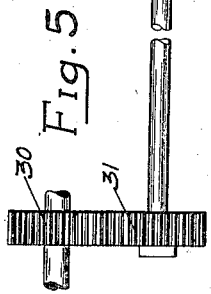
Fig. 5 is a sectional elevation on the line V—V of Fig. 4, to show the detail of the friction pinion and pulley and the driving shaft for the rack gears.

I have indicated on the drawing by arrows, the constant direction of motion of the belt pulley 67 and by similar arrows have indicated the motion of the various pulleys, sprockets, pinions and racks for the forward motion. When the feed table has moved forward far enough to make a thorough cut of the stock on the same, the stops 55 engage the arms 72, forcing them forward, and at the same time the operator releases the foot lever 50. These arms are each keyed to a cross shaft 73, which is journalled in the ends of the frame. The forward movement of this arm 72 depresses the arm 74 which is likewise keyed to the shaft 73, and also at its opposite end is attached to the vertical rod 46, depressing this rod and carrying with it the end of the swinging frame 45, thus bringing the pulley 71 downward until the hub of the same comes against the upper side of the friction pinion 70. This causes the motion of the pulley 71 to reverse and through the various gears before mentioned, reverses the motion of the feed table causing the same to quickly travel backward until the stop 56 engages the arm 72 rotating the same to the left, (Fig. 4), and raising the vertical rod 46 until the pulley 71 is carried away from engagement with the paper friction 70. In making this latter movement however, the arm 72 is forced to raise the weight of the free end of the swinging frame 45 and the pulley 71, so that these act as a check to bring the table to rest rather than to reverse the same, and cause an additional forward motion. The length of travel of the table is regulated by adjusting the position of the stops 55 and 56.

When it is desired to cut stock to a longer length than the width of the table 22, it is necessary to move the saws 3 to such distance apart as will give the greater length of stock. If this length is very slightly greater, than the width of the table 22, this is done by moving each of the saws an equal amount. If however, the extra length is great enough to permit it, one of the saws only is moved and the cross bar 75, (see Fig. 6) is laid on the feed table adjacent the saw table 22, spanning from the bar 51 at the front of the table to the similar bar at the rear of the same, and this bar is clamped to the said bars 51 by means of a clamp 76, and a clamping bolt 77. If longer stock is to be cut off, the two saws are moved equally as shown in Fig. 6, and two of these auxilliary bars 75 are used as are shown. It will be seen that these bars move with the feed table, and support the stock adjacent to the saw, as did the saw table 22, in the case of short stock. They may be lined with fiber, as is the saw table 22, if it should be so desired, though in the views, this is not shown. The saws 3, are moved closer to or further apart by rotating the hand wheel 18, thus causing the nut 20 to move along the screw 15, in such direction as may be desired, and with it, to carry the bracket 21, which is attached to and moves the cross bracket 7, which carries the bearing 5 in which the saw shaft 2, is longitudinally fixed.

It will of course be readily seen that various minor details of this machine, may be changed without the same. It will be noted that pulleys which are stated to be keyed on, may be set screwed, or otherwise fastened, without departing from the spirit of my invention and that no such detail should be construed to limit my invention. In the claims I have used the word "fastened" to indicate such keying, set screwing or the like.

Having fully described my invention, what I claim and desire to secure by Letters Patent in the United States is:—

1. In a cut off saw, a frame, a feed table mounted transversely thereon, and means for actuating said table, oppositely disposed saw arbors lying substantially along the longitudinal axis of the frame, saws mounted on the said arbors at the inner or contiguous ends thereof, a bearing for the saw end of each arbor, carrying the said arbor longitudinally fixed therein, a bracket carrying the said bearing, adjustably mounted on the said frame, means for clamping the said bracket to and unclamping the same from the said frame, means for moving the said bearing longitudinally along the said frame, a fixed bearing for the outer end of each saw arbor, rigidly mounted on the said frame, a spline extending along the outer portion of the said arbor and fastened thereto, a belt pulley slidably mounted on each arbor and having a key way adapted to receive the said spline, a hub extending laterally beyond the face of the pulley and journalled in the said fixed bearing, and a collar to prevent longitudinal motion of the said pulley hub in the said bearing.

2. In a cut off saw, a frame, a feed table mounted transversely thereon and means for actuating said table, oppositely disposed saw arbors lying substantially along the longitudinal axis of the frame but diverging slightly forward therefrom at the outer ends to provide saw clearance, saws mounted on the said arbors at the inner or contiguous ends thereof, a bearing for the saw end of each arbor, carrying the said arbor longitudinally fixed therein, a bracket carrying the said bearing and adjustably mounted on the said frame, means for clamping said bracket to, and unclamping the same from, said frame, means for moving the said adjustable bearing longitudinally along the said frame, a fixed bearing for the outer end of each saw arbor, rigidly mounted on the said frame, a spline extending along the outer portion of the said arbor and fastened thereto, a belt pulley slidably mounted on each arbor and having a key way adapted to receive the said spline, a hub extending laterally beyond the face of the pulley and journalled in the said fixed bearing, and a collar to prevent longitudinal motion of the said pulley hub in the said bearing.

3. In a cut off saw, a frame, a feed table, mounted transversely thereon, and means for actuating said table, oppositely disposed saw arbors lying substantially along the longitudinal axis of the frame but diverging slightly forward therefrom at the outer ends to provide saw clearance, saws mounted on the said arbors at the inner or contiguous ends thereof, a bearing for the saw and of each arbor, means for holding the said arbor against longitudinal motion in the said bearing, a bracket carrying the said bearing adjustably mounted on the said frame, means for clamping said bracket to said frame and releasing the same, a nut carried by the said bracket, a screw engaging said nut and longitudinally fixed extending to and mounted in one end of the said frame, a hand wheel fastened on the said screw to turn the same, a fixed bearing for the outer end of each saw arbor, rigidly mounted on the said frame, a spline extending along the outer portion of the said arbor and fastened thereto, a belt pulley slidably mounted on each arbor and having a key way adapted to receive the said spline, a hub extending laterally beyond the face of the pulley and journalled in the said fixed bearing, and a collar to prevent longitudinal motion of the said pulley hub in the said bearing.

4. In a cut off saw, a frame, a feed table, mounted transversely thereon, and means for actuating said table, oppositely disposed saw arbors lying substantially along the longitudinal axis of the frame but diverging slightly forward therefrom at the outer ends to provide saw clearance, saws mounted on said arbors at the inner or contiguous ends thereof, a bearing for the saw end of each arbor, means for holding the said arbor against longitudinal motion in the said bearing, a bracket carrying the said bearing adjustably mounted on the said frame, a clamp to fasten each end of the said bracket, a bolt passing through the said clamp and the said bracket, a nut to tighten or loosen the clamp, a nut carried by the said bracket, a screw engaging said nut and longitudinally fixed extending to and mounted in one end of the said frame, a hand wheel fastened on the said screw to turn the same, a second bearing for the outer end of each saw arbor, rigidly mounted on the said frame, a spline extending along the outer portion of the said arbor and fastened thereto, a belt pulley slidably mounted on each arbor and having a key way adapted to receive the said spline, a hub extending laterally beyond the face of the pulley and journalled in the said fixed bearing, and a collar to prevent longitudinal motion of the said pulley hub in the said bearing.

5. In a cut off saw the combination with a main frame, cut off saws mounted thereon, means for driving the saws, and means for adjusting the same, of a feed for the same comprising a guide attached to the top of the said frame and lying laterally across the frame between the saws, a sliding member mounted therein, a saw table attached to the said sliding member, a frame attached to the said saw table, and extending on each side thereof, stops adjustably mounted thereon, means for driving said table forward and backward and means for controlling said driving means comprising a foot lever for iniating the said forward motion, a trip shaft extending longitudinally along said main frame bearings in said frame carrying said trip shaft, arms fastened to the said shaft and extending upward therefrom into the path of the stops on the frame of the said feed table, and connecting means between the said trip lever and said driving means, thereby the forward motion will be stopped and reversed by the forward stops on the said table frame and the backward motion will be arrested, but not reversed by the opposite stops.

6. In a cut off saw the combination with a main frame, cut off saws mounted thereon, means for driving the saws, and means for adjusting the same, of a feed for the same comprising a guide attached to the top of the said frame along the lateral axis thereof, a sliding member mounted therein, a saw table attached to the said sliding member, a frame attached to the said saw table, comprising bars extending at right angles to each end of the table, bars on each side of and parallel with the said saw table extending between said first bars and means for bracing said frame, stops adjustably mounted thereon, a rack beneath the said sliding member, an idler pinion engaging therewith, a driving pinion engaging the said idler pinion, a shaft carrying said driving pinion and extending laterally therefrom to one end of the said frame, a bearing for said shaft attached to the said frame, a sprocket wheel mounted on, and driving said shaft, a swinging frame mounted on the said shaft, bearings on the said swinging frame, a shaft journalled therein, a double faced friction pulley fastened on said shaft, a driving sprocket fastened on said shaft, a sprocket chain from said driving sprocket to said sprocket wheel, a friction pinion, a shaft driving said pinion, a bearing for the said shaft fastened to the said main frame, a belt pulley fastened on the said shaft, to drive the same, a rod attached to the free end of the said swinging frame, a shaft extending longitudinally along the main frame, supports for the said shaft in said frame, a lever arm fastened to the said shaft and extending to and supporting the said rod, a foot lever fastened to and extending outward from the said shaft, a trip shaft extending longitudinally along the main frame, bearings in the main frame carrying the said trip shaft, an arm attached to the trip shaft extending therefrom and pivotally attached to the said rod and arms fastened to the trip shaft and extending upward therefrom into the path of the stops on the frame of the said feed table, whereby the motion of the said feed table may be reversed at the end of a predetermined path.

7. In a cut off saw, the combination with a main frame, cut off saws mounted thereon, means for driving the saws, and means for adjusting the same, of a feed for same comprising a guide attached to the top of the said frame and lying laterally across the same between the saws, a sliding member mounted therein, a saw table attached to the said sliding member, a frame attached to the said saw table, stops adjustably mounted thereon, a rack beneath the said sliding member, an idler pinion engaging therewith, a swinging frame, bearings on the said frame, a shaft journalled therein, a double faced friction pulley fastened on said shaft, means for driving said rack pinion from said friction shaft, a friction pinion, shaft driving said pinion, a bearing for said shaft fastened to said frame, means for driving said shaft, a rod attached to the free end of the said swinging frame, a shaft extending longitudinally along the main frame, supports for said shaft in said frame, a lever arm fastened to said shaft and extending to and supporting said rod, a foot lever fastened to and extending outward from said shaft, which when depressed, will raise said friction pulley into engagement with said friction pinion to drive said feed table forward, a trip shaft extending longitudinally along said main frame bearings in said frame carrying said trip shaft, an arm attached to said shaft extending therefrom and pivotally attached to said rod and arms fastened to said shaft and extending upward therefrom into the path of the stops on the frame of the said feed table, whereby one set of said stops coacting with said trip arms, will force said friction pulley downward and bring the face of the hub of said pulley into engagement with said friction pinion to reverse said motion and the weight of said pulley will hold the same in engagement until the second set of said stops coacting with said trip arms raises the said pulley and stops the motion of said table.

8. In a cut off saw the combination with a main frame, cut off saws mounted thereon, means for driving the saws, and means for adjusting the same, of a feed for the same comprising a guide attached to the top of the said frame and lying laterally across the frame between the saws, a saw table slidably mounted thereon stops adjustably mounted on the said saw table, means for reciprocating the said saw table, a double faced friction pulley, driving means connecting said friction pulley and said reciprocating means, a paper friction pinion, a shaft driving said pinion, a bearing for said shaft fastened to said frame, driving means for said shaft, a foot lever, and means operatively connecting said lever and said friction pulley whereby when said lever is depressed said friction pulley will be raised into engagement with the bottom of the said friction pinion to drive the said feed table forward, arms disposed in the path of the said stops and operative means connecting said arms and said friction pulley whereby when one set of the said stops come into engagement with said arms, the said friction pulley will be depressed to bring the same into engagement with the top of the said friction pinion and reverse the motion of the said feed table, and when the second set of said stops come into engagement with said arms, will raise the said friction pulley and arrest the return motion of the said table.

9. In a cut off saw, a frame, a feed table mounted transversely thereon, and means for actuating said table, oppositely disposed saw arbors lying at an angle with the longitudinal axis of the frame, saws mounted on the said arbors at the inner or contiguous ends thereof, a bearing for the saw end of each arbor, carrying the said arbor longitudinally fixed therein, a bracket carrying the said bearing adjustably mounted on the said frame, means for clamping the said bracket to and unclamping the same from the said frame, means for moving the said bracket longitudinally along the said frame, and means for driving the said saws.

10. In a cut off saw, a frame, a feed table mounted transversely thereon and means for actuating said table, oppositely disposed saw arbors lying at an angle with the longitudinal axis of the frame, saws mounted on the said arbors at the inner or contiguous ends thereof, a bearing for the saw end of each arbor, carrying the said arbor longitudinally fixed therein, means for moving the said bearing longitudinally along the said frame, and means for driving the said saws.

11. In a cut off saw, a frame, a feed table mounted transversely thereon, and means for actuating said table, oppositely disposed saw arbors lying at an angle with the longitudinal axis of the frame, saws mounted on the said arbors at the inner or contiguous ends thereof, a bearing for the saw end of each arbor, means for holding the said arbor against longitudinal motion in the said bearing, a bracket carrying the said bearing adjustably mounted on the said frame, means for clamping said bracket to said frame and releasing the same, a nut carried by the said bracket, a screw engaging said nut and longitudinally fixed extending to and mounted in one end of the said frame, a hand wheel fastened on the said screw to turn the same, and means for driving the said saws.

12. In a cut off saw, a frame, a feed table, mounted transversely thereon, and means for actuating said table, oppositely disposed saw arbors lying at an angle with the longitudinal axis of the frame, saws mounted on said arbors at the inner or contiguous ends thereof, a bearing for the saw end of each arbor, means for holding the said arbor against longitudinal motion in the said bearing, means for adjusting the position of said bearing along the longitudinal axis of said frame, a bearing for the outer end of each saw arbor, rigidly mounted on the said frame, and means for driving the said saws.

In testimony whereof I have hereunto set my name.

THOMAS L. LA MALTA.

Witnesses:
L. E. WALDEN,
C. J. MURRAY.